United States Patent
Moroo et al.

(10) Patent No.: US 7,463,750 B2
(45) Date of Patent: Dec. 9, 2008

(54) IMAGE DATA PROCESSING APPARATUS AND METHOD

(75) Inventors: Jun Moroo, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 637 days.

(21) Appl. No.: 10/609,630

(22) Filed: Jul. 1, 2003

(65) Prior Publication Data

US 2004/0014460 A1 Jan. 22, 2004

(30) Foreign Application Priority Data

Jul. 18, 2002 (JP) .............................. 2002-209497

(51) Int. Cl.
*G06K 9/00* (2006.01)
*H04M 3/42* (2006.01)
*H04L 9/00* (2006.01)

(52) U.S. Cl. ..................... 382/100; 455/414.1; 713/176

(58) Field of Classification Search ................. 382/100, 382/232, 240; 370/522–529; 283/42, 74–81, 283/85, 93, 113, 901, 902, 72; 380/51, 54, 380/201, 210, 252, 287; 713/176, 179; 348/460, 348/461; 704/463, 465; 455/414.1, 418, 455/550.1, 556.1
See application file for complete search history.

(56) References Cited

U.S. PATENT DOCUMENTS 6,131,162 A * 10/2000 Yoshiura et al. ............. 713/176
6,683,966 B1 * 1/2004 Tian et al. ................... 382/100
7,013,023 B2 * 3/2006 Ehrmann Patin et al. .... 382/100
7,050,604 B2 * 5/2006 Fujihara et al. ............. 382/100
7,068,809 B2 * 6/2006 Stach ......................... 382/100
2002/0083324 A1 * 6/2002 Hirai .......................... 713/176

FOREIGN PATENT DOCUMENTS

JP          2000-184324      6/2000
WO          WO 00/70585      11/2000

OTHER PUBLICATIONS

Japanese Patent Office Action, mailed Feb. 27, 2007 and issued in corresponding Japanese Patent Application No. 2002-209497 (2 pages).
Japanese Patent Office Action, mailed May 29, 2007 and issued in corresponding Japanese Patent Application No. 2002-209497.

* cited by examiner

*Primary Examiner*—Abolfazl Tabatabai
(74) *Attorney, Agent, or Firm*—Staas & Halsey LLP.

(57) ABSTRACT

A mobile telephone serving as a first apparatus enters image data with stegano data embedded, that cannot be recognized visually, the mobile telephone sending the entered image data to the outside and receiving the result of processing from the outside, for holding the same. A server acting as a second apparatus effects data processing on the image data received from the mobile telephone, to acquire stegano data, and sends the acquired stegano data as the result of processing to the mobile telephone. Being the mobile telephone with a camera having a limited processing performance, the first apparatus sends image data with stegano data embedded to the second apparatus, such as the server, having a high processing capability and being connected to the first apparatus through a communication path, in order to acquire the result of processing.

12 Claims, 13 Drawing Sheets

IMAGE DATA PROCESSING APPARATUS AND METHOD

BACKGROUND OF THE INVENTION

1. Field of the Invention

The present invention relates generally to an image data processing apparatus and method for processing image data in a device-having an image entry function, for example, a mobile telephone with a camera, and more particularly to an image data processing unit and method for acquiring a stegano data embedded in an image, by use of image processing.

2. Description of the Related Arts

Recently, with the increasing use of the Internet by mobile telephones, the development of mobile telephones mounting cameras, scanners or other image input devices has being made enthusiastically. By the use of such mobile telephones, image data acquired by image input devices can be utilized, if the acquired image data is sent from the own mobile telephone to terminals, such as another mobile telephone or a personal computer, through the Internet or other communication networks. On the other hand, for example, U.S. Pat. No. 5,636,292 discloses a method for utilizing image data in its Specification and Drawings, wherein an image input device such as a scanner or camera is connected to a personal computer. In this method for utilizing image data, images such as printed matters, in which steganographic encoded information (hereinafter referred to as "stegano data") is embedded, are read-out to a personal computer by an image input device, and the stegano data is detected and sent to a server. On the server side, a URL corresponding to the detected stegano data is searched, and the searched URL is sent back to the personal computer, and the personal computer makes access to a web site corresponding to the URL, for allowing information corresponding to the image to be displayed.

However, even if such a method for detecting stegano data and utilizing image data is to be carried out in the conventional mobile telephone with a camera, image processing for detecting stegano data that has been executed on a personal computer would not be able to be executed within a practical processing time due to the limitation of the processing performance by memory or a CPU that can be used for mobile telephones.

SUMMARY OF THE INVENTION

According to the present invention, there is provided an image data processing apparatus and method, that can execute complex image processing at a high speed, even if the processing performance on the image input side is low.

It is therefore the object to provide an image data processing apparatus comprising a first apparatus such as a mobile telephone which enters image data with embedded stegano data that cannot be recognized visually, the first apparatus sending the entered image data to the outside and receiving the result of processing from the outside for holding the same; and a second apparatus such as a server which effects data processing on the image data received from the first apparatus to acquire stegano data, the second apparatus sending the acquired stegano data as the result of processing to the first apparatus. Thus, the first apparatus can execute an analysis processing of image-embedded information at high speed, otherwise, such information would take a lot of processing time.

In this case, the first apparatus comprises an image data input unit which enters image data with stegano data embedded; a data sending unit which sends the entered image data to the outside; a result data receiving unit which receives the processed result data from the second apparatus; and a result holding unit which holds the received result data, whilst the second apparatus comprises an image data receiving unit which receives image data from the first apparatus; a data holding unit which holds the received image data; an image data processing unit which effects processing on image data to acquire stegano data; and a result data sending unit which sends the acquired stegano data as result data to the first apparatus, and wherein a communication path always or intermittently connects the first apparatus and the second apparatus.

In the present invention, the second apparatus converts the acquired stegano data into other information, for sending as result data to the first apparatus, whereas the first apparatus sends the result data received from the second apparatus to an external third apparatus, for receiving another result of processing. Thus, stegano data acquired by the second apparatus is converted to a URL, etc., such that a web site can be read through access to the third apparatus, thereby eliminating the need of embedding the vast amounts of information in the image data. The first apparatus includes a pre-processing unit which executes pre-processing of the entered image data, the pre-processing being part of image processing to be performed on the side of the second apparatus. Because of this provision, the load applied to the second apparatus can be reduced. The first apparatus splits the entered image data into a plurality of areas, to send some of the split image data to the second apparatus, whereas the second apparatus effects image processing on the some image data received from the first apparatus, the second apparatus, if stegano data cannot be acquired, sequentially requesting the first apparatus to make a re-transfer, for image processing, of image data of the remaining split areas until the second apparatus acquires stegano data. As the stegano data is usually embedded in a portion of the image, when a split portion is sequentially sent, instead of sending the image data as a whole, while the second apparatus is detecting the stegano data, load of image processing on the second apparatus side can be reduced, and communication speed can be increased. The first apparatus compresses image data entered and held, for sending to the second apparatus, and the second apparatus restores the compressed image data received from the first apparatus, for effecting. image processing. Thus, by the compression of the data to be sent from the first apparatus to the second apparatus, the amount of data to be sent can be reduced, and the communication time can also be reduced.

The present invention provides an image data processing method comprising the steps of:

- by a first apparatus, entering image data with embedded stegano data that cannot be recognized visually and sending the image data to a second apparatus;
- by a second apparatus, effecting data processing on the image data received from the first apparatus, to acquire stegano data; and
- by the second apparatus, sending the acquired stegano data as a result of processing to the first apparatus; and
- by the first apparatus, receiving and holding the result data received from the second apparatus. The details of the image processing method will become substantially the same as the case of the apparatus.

The present invention further provides an apparatus itself such as a mobile telephone having limited processing capabilities, the apparatus comprising an image data input unit which enters image data with stegano data embedded; a data sending unit which sends the entered image data to the outside; a result data receiving unit which receives stegano data as result data from the outside; and a result holding unit which holds the received result data.

The above and other objects, aspects, features and advantages of the present invention will become more apparent from the following detailed description when taken in conjunction with the accompanying drawings.

DETAILED DESCRIPTION OF THE PREFERRED EMBODIMENTS

Figure 1:
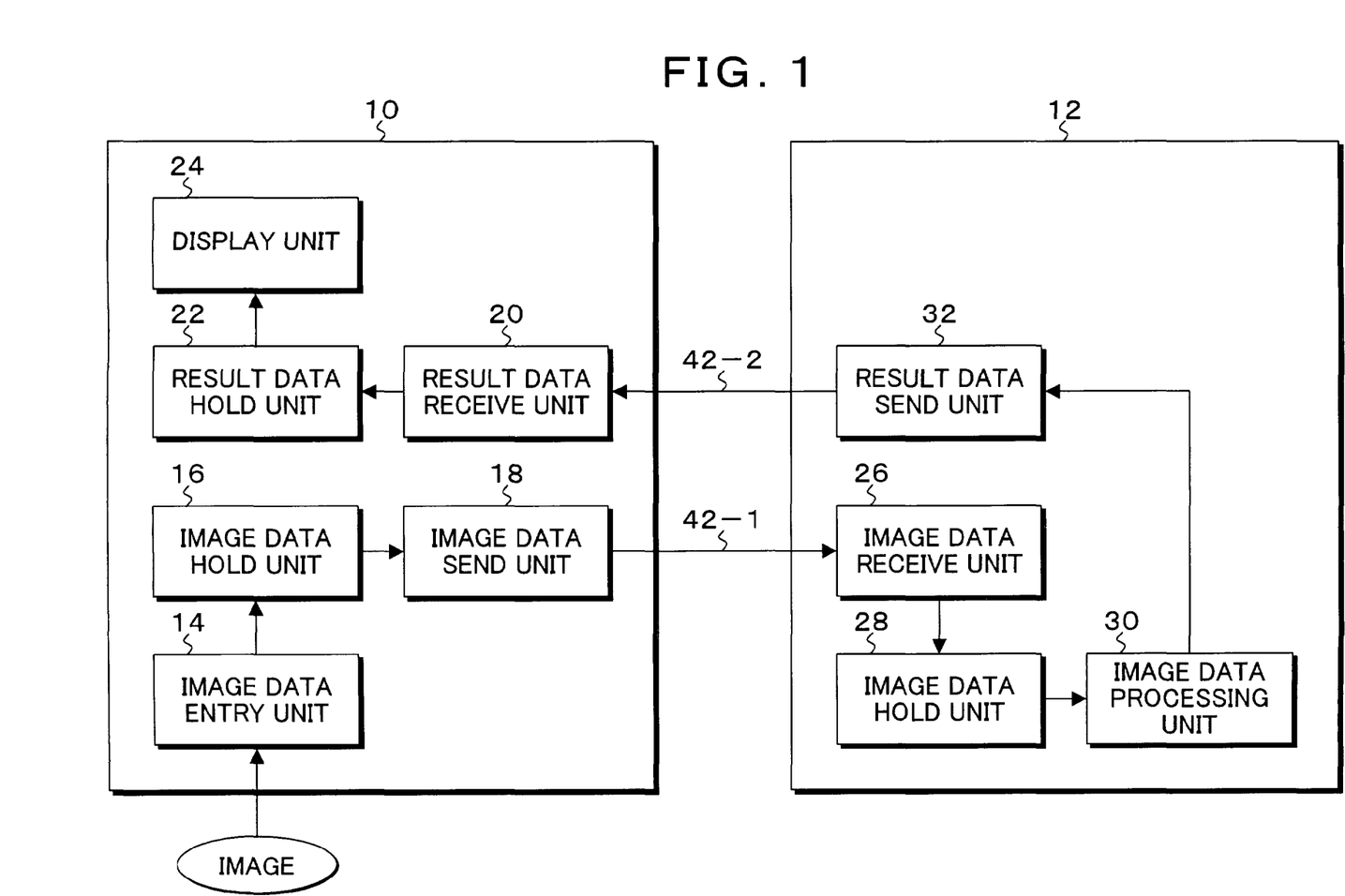
FIG. 1 is a block diagram of a first embodiment according to the present invention.
Figure 2:
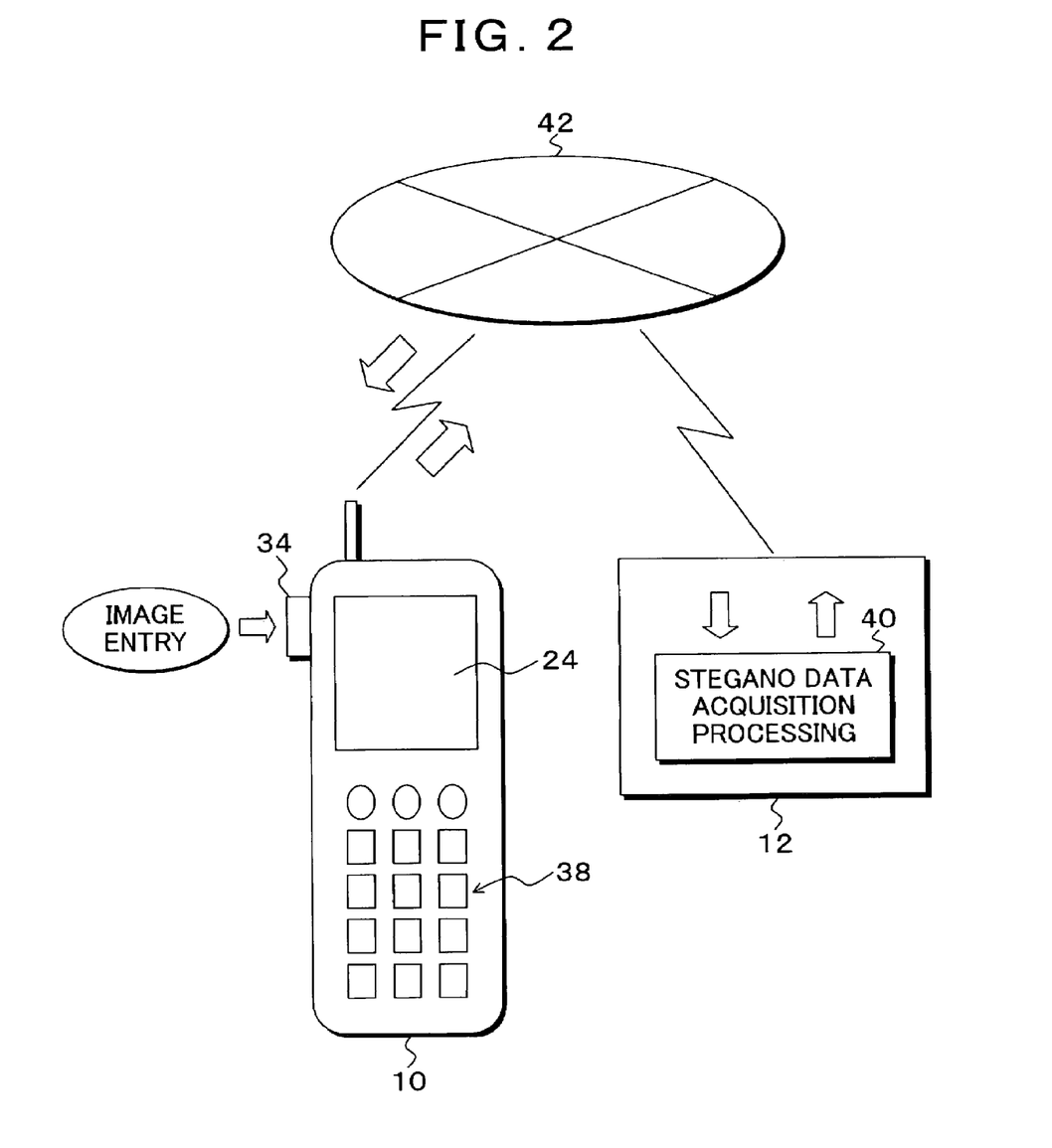
FIG. 2 is a diagram for describing image data processing operations according to FIG. 1.

FIG. 1 is a block diagram of a first embodiment according to the present invention. An image data processing apparatus according to the present invention comprises a mobile telephone 10, which functions as a first apparatus, and a server 12, which functions as a second apparatus. On the mobile telephone 10, an image data input unit 14, an image data holding unit 16, an image data sending unit 18, a result data receiving unit 20, a result data holding unit 22, and a display unit 24 are provided. Also, an image data receiving unit 26, an image data holding unit 28, an image data processing unit 30, and a result data sending unit 32 are provided on the server 12. The image data input unit 14 of the mobile telephone 10 enters images using a CMOS sensor or CCD sensor. The mobile telephone 10 comprises, for example, as shown in FIG. 2, the display unit 24, a key operation unit 38, and a camera 34. The image data processing unit 30 provided on the server 12 performs image processing for acquiring stegano data with respect to the image data sent from the mobile telephone 10. As the image data processing for acquiring the stegano data, for example, the processing disclosed in Specification and drawings of U.S. Pat. No. 5,636,292 can be employed.

FIG. 2 shows brief image data processing operations in a first embodiment according to FIG. 1. The camera 34 is provided as a single piece with the mobile telephone 10, and images including printing matters with stegano data embedded, which is an object of the present invention, can be entered. The image data entered through the camera 34 of the mobile telephone 10 is sent to the server 12 through a communication line 42, and stegano data is acquired by the execution of a stegano data acquisition processing 40 in the server 12, so that the acquired stegano data is sent back to the mobile telephone 10 through the communication line 42.

Figure 3:
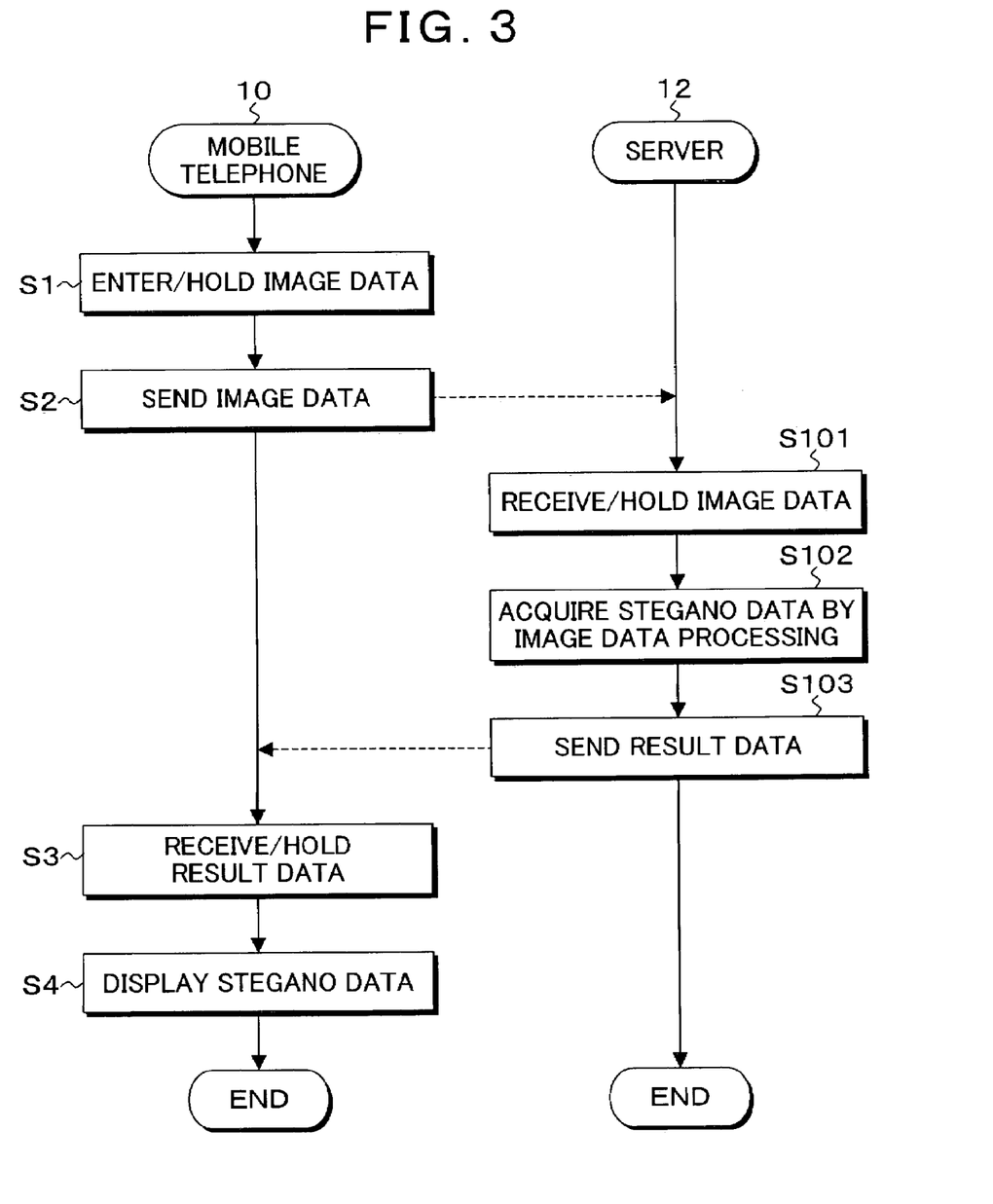
FIG. 3 is a time chart of processing procedures of a first apparatus and a second apparatus shown in FIG. 1.

FIG. 3 is a time chart of processing procedure including communications exchanged between the mobile telephone 10 and server 12 in a first embodiment shown in FIG. 1. Referring to FIG. 3, operations of a first embodiment shown in FIG. 1 is described as follows. When an image data input unit 14 takes a picture of image data, such as printed matters with stegano data embedded, and enters the picture, the image data is held in an image data holding unit 16 at step S1, wherein the image data input unit 14 comprises a CMOS sensor and CCD sensor as the camera 34 provided on the mobile telephone. Then at step S2, an image data sending unit 18 sends the data held in the image data holding unit 16 to the server 12 through a communication line 42-1. In sending, the destination information of the mobile telephone 10, which is to be the destination of the result of processing, is sent together with the image data. In the server 12, after an image receiving unit 26 receives the image data and destination information sent from the mobile telephone 10 at step S101, the data is held in an image data holding unit 28. Next at step S102, the image data is called out of the image data holding unit 28, and, a stegano data acquisition processing is executed, for example, as disclosed in Specification and Drawings of U.S. Pat. No. 5,636, 292, for acquiring stegano data from the image data. The stegano data acquired by an image data processing unit 30 is sent to a result data sending unit 32, and at step S103, the stegano data is sent to the mobile telephone 10 as a result data, through a communication path 42-2, based on the destination information received together with the image data at step S103. The result data from the server 12 is received by a result data receiving unit 20 of the mobile telephone 10 at step S3, and held in a result data holding unit 22. The stegano data held in the result data holding unit 22 is given to a display unit 24, and at step S3, the stegano data received from the server 12 is displayed on the screen of the mobile telephone 10.

Figure 4:
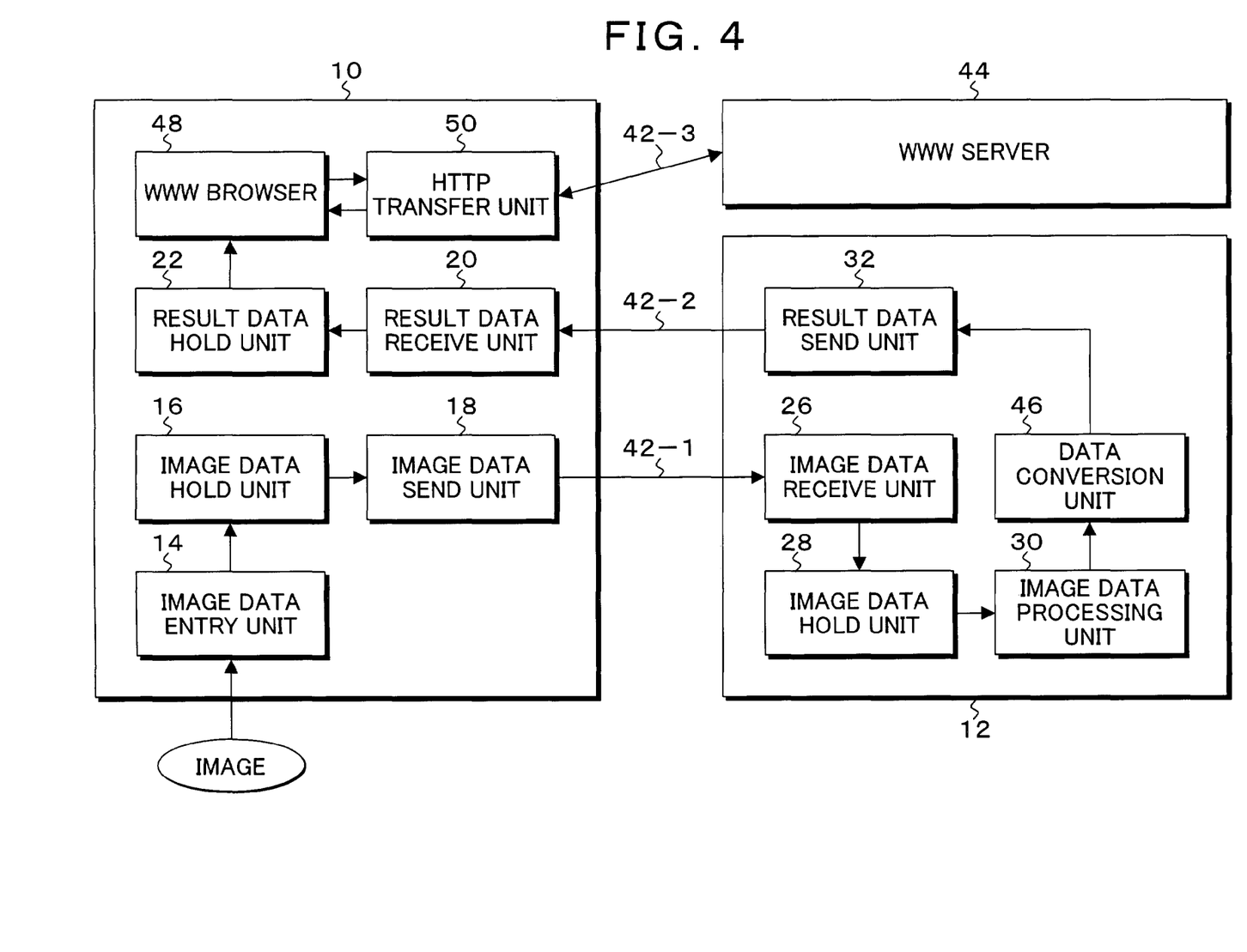
FIG. 4 is a block diagram of a second embodiment according to the present invention.

FIG. 4 is a block diagram of a second embodiment according to the present invention. This second embodiment is characterized in that the stegano data acquired on the server side is further converted into the address of another apparatus, for example, URL, and returned to the mobile telephone. On the mobile telephone 10, an image data input unit 14, an image data holding unit 16, an image data sending unit 18, a result data receiving unit 20, and a result data holding unit 22 are provided, and the configuration for these units is the same as that in the first embodiment. In addition to these units, a WWW browser 48, and a HTTP transfer unit 50 are further provided on the mobile telephone 10. While on the server 12, in addition to an image data receiving unit 26, an image holding unit 28:, an image data processing unit 30, and a result data sending unit 32, a data conversion unit 46 is further provided. The data conversion unit 46 has a function of converting the stegano data acquired by the image data processing unit 30 into a URL, that is the address of a WWW server 44 functioning as a third apparatus.

Figure 5:
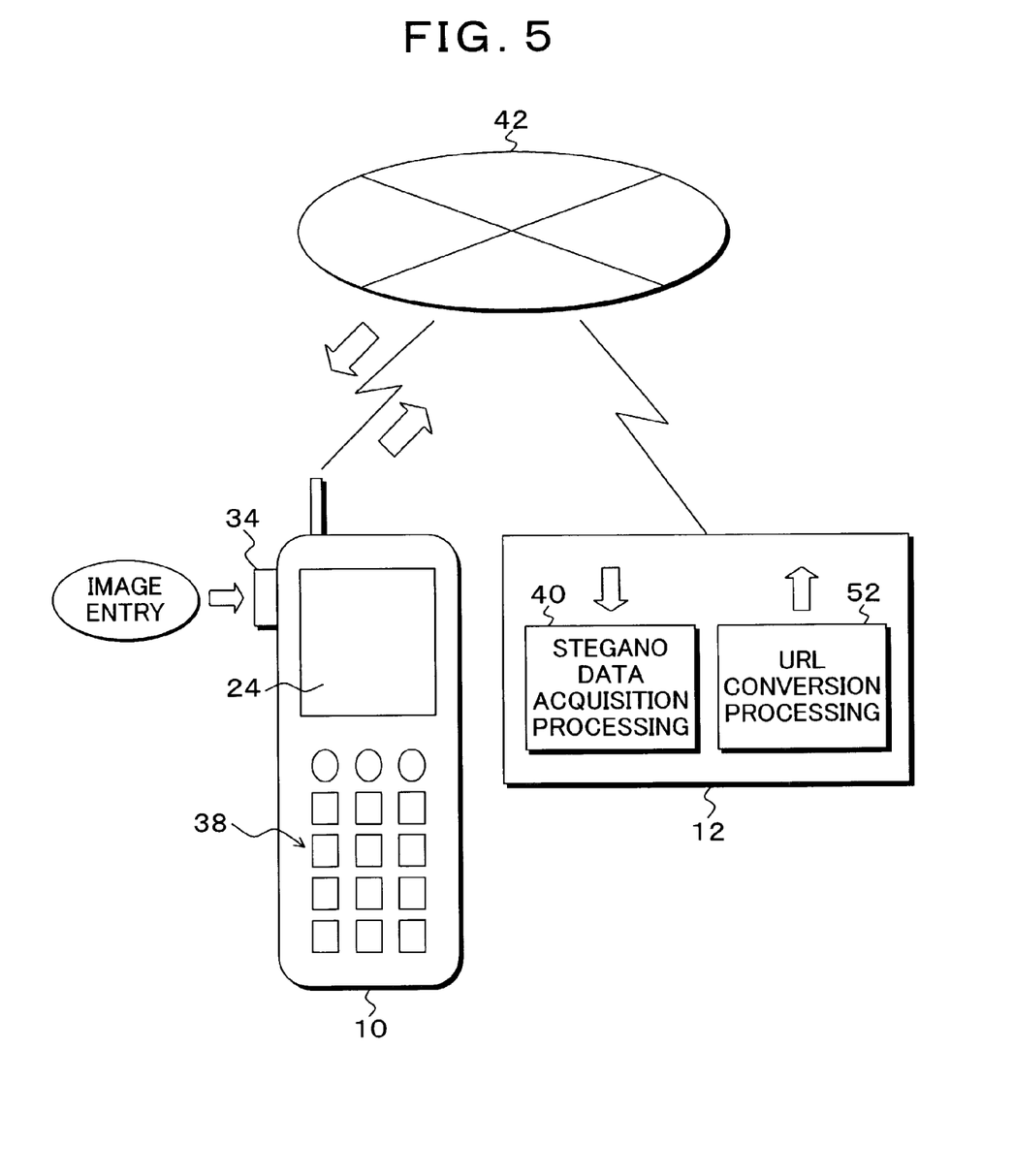
FIG. 5 is a diagram for describing image data processing operations according to FIG. 4.

FIG. 5 is a diagram for briefly showing image data processing operations in the second embodiment shown in FIG. 4. In processing operations of this second embodiment, the image data including the stegano data entered through the camera 34 of the mobile telephone 10 is sent from the communication line 42 to the server 12, and the stegano data is acquired by the execution of the stegano data acquisition processing 40, and the acquired data is further converted to the address, or URL of the WWW server, that is the third apparatus, through a URL conversion processing 52, and sent back to the mobile telephone 10 through the communication line 42.

Figure 6:
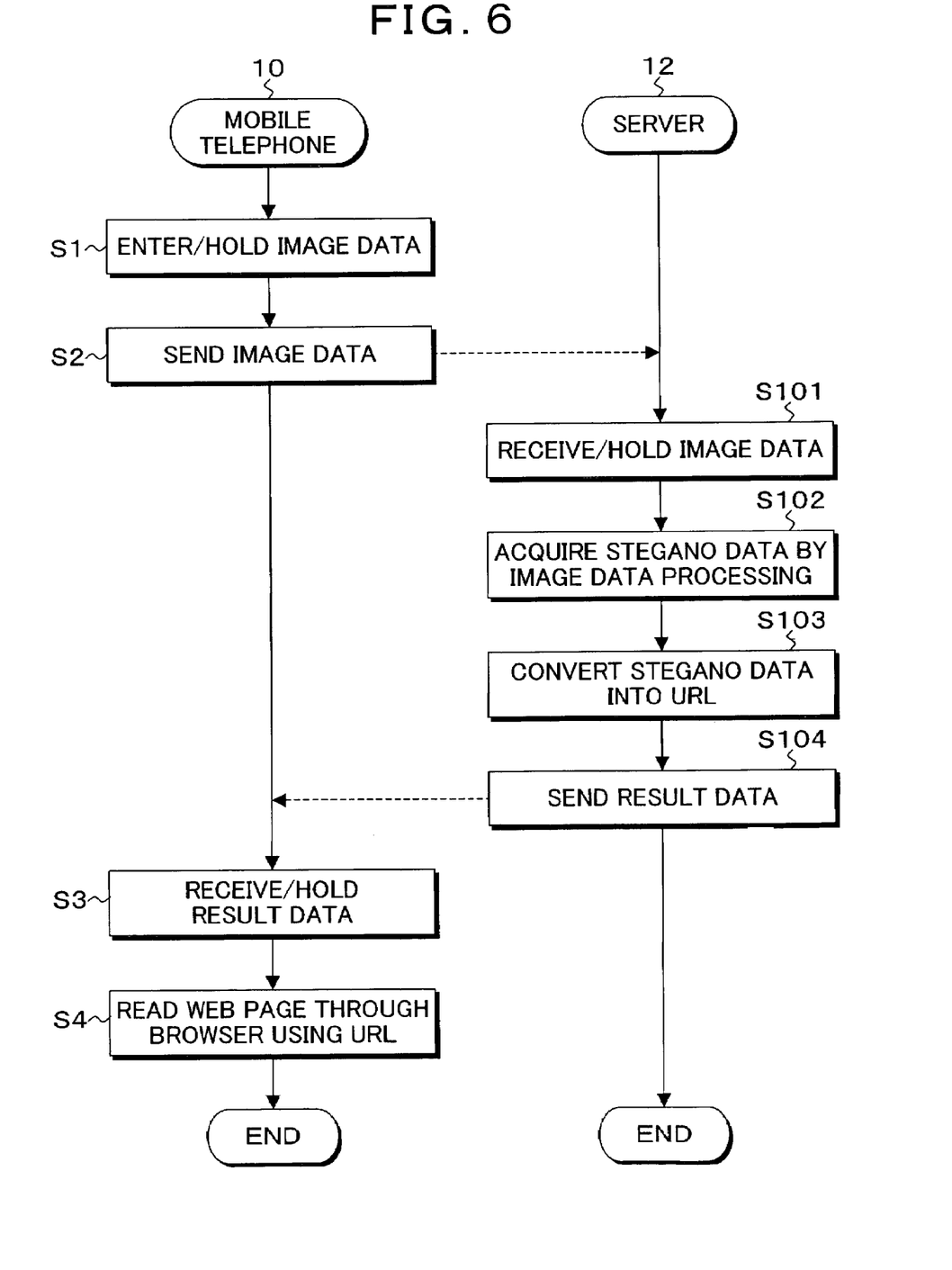
FIG. 6 is a time chart of processing procedures of the first apparatus and the second apparatus shown in FIG. 4.

FIG. 6 is a time chart of processing procedure including communications exchanged between the mobile telephone and server in the second embodiment shown in FIG. 4, and with reference to the figure, processing operations of the second embodiment are described as follows. The image data including the stegano data entered from the image data input unit 14 realized by the CMOS sensor or CCD sensor provided on the mobile telephone 10 as the camera 34 is sent to the server 12 from the image data sending unit 18 through the communication path 42-1 at step S2, after being entered and held in the image data holding unit 16 at step S1. At this time, together with the image data, the destination information is sent, indicating the destination, to which the result of processing is to be sent. At step S101, the server 12 allows the image data receiving unit 26 to receive the image data from the mobile telephone 10, and holds the image data in the image data holding unit 28. Then at step S102, the server reads the image data out of the image data holding unit 28, and the image data processing unit 30 executes a stegano data acquisition processing. The stegano data acquired by the image data processing unit 30 is given to a data conversion unit 46 at step S103, for converting into a URL, the address of a WWW server 44, that is to be a third apparatus, using of a conversion table, where the acquired stegano data is registered beforehand. The URL converted by the data conversion unit 46 is given to a result data sending unit 32 through the communication path 42-2 at step S104, and sent to the mobile telephone 10 through the communication path 42-1. At step S3, the mobile telephone 10 allows a result data receiving unit 20 to receive the URL converted from the stegano data as the result data from the server 12, and holds the URL in a result data holding unit 22. And at step S4, using the URL held in the result data holding unit 22, a WWW browser 48 gains access to a WWW server 44 through a HTTP transfer unit 50, and displays the home page specified by the URL of the WWW server 44 on the screen of the mobile telephone 10 such that the user can read it. In the second embodiment shown in FIG. 4, a data conversion unit 46 provided on the server 12 performs conversion from stegano data into a URL, or an address, however, another server may be provided as a fourth apparatus with the function of the data conversion unit 46, such that stegano data is sent to this server of the fourth apparatus from the mobile telephone 10 or server 12, for acquiring the address or URL of the WWW server 44 that is to be the third apparatus.

Figure 7:
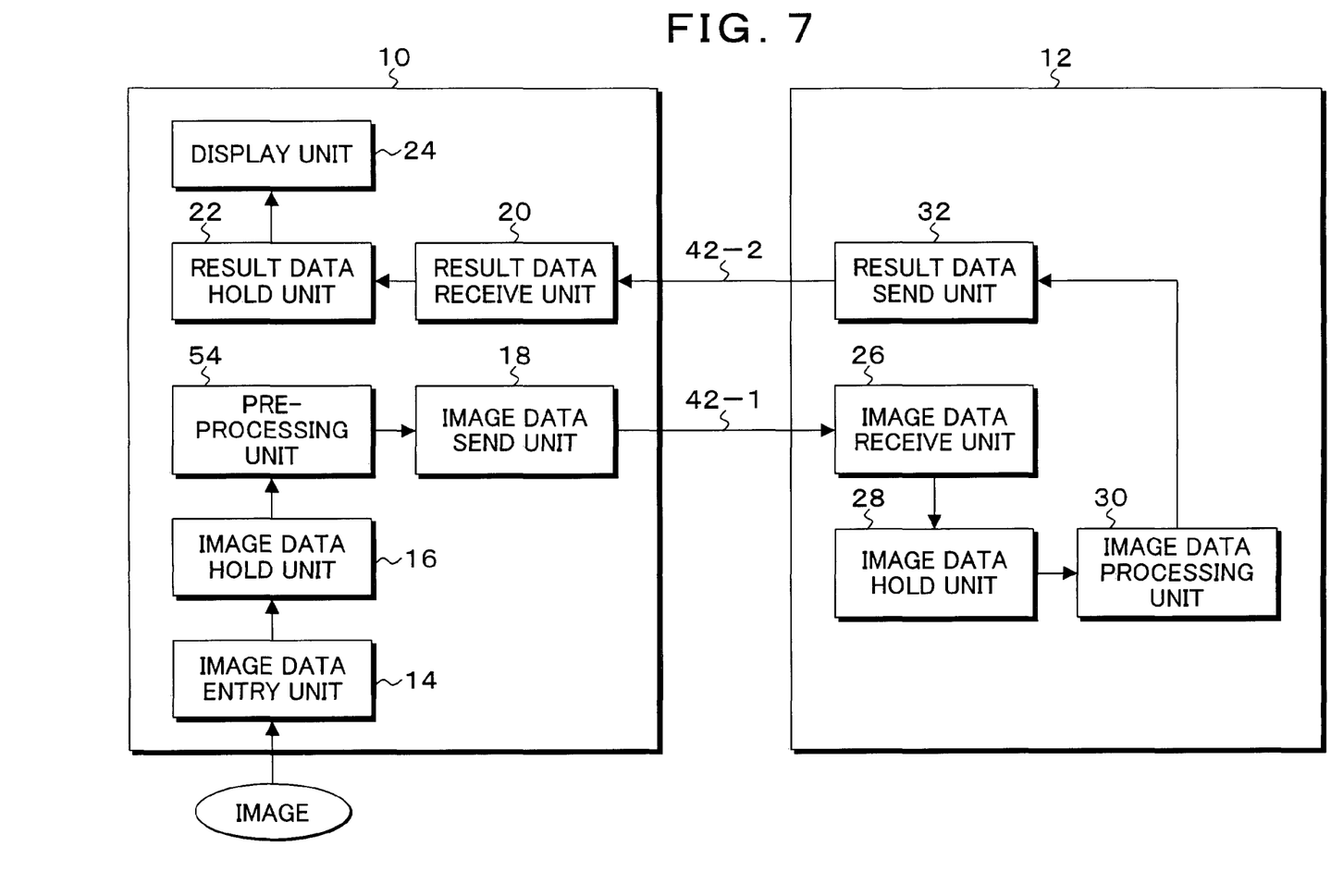
FIG. 7 is a block diagram of a third embodiment according to the present invention.

FIG. 7 is a block diagram of a third embodiment according to the present invention. This third embodiment is characterized in that part of image data processing is performed as pre-processing, since the side of the mobile telephone 10 acquires stegano data in the server 12. For the mobile telephone 10 as the first apparatus, an image input unit 14, an image data holding unit 16, an image data sending unit 18, a result data receiving unit 20, a result data holding unit 22, and a display unit 24 are provided, and the configuration for these units is the same as that in the first embodiment shown in FIG. 1. Furthermore, a pre-processing unit 54 is provided between the image data holding unit 16 and the image data sending unit 18. The pre-processing unit 54 performs pre-processing for converting the color image data entered by the image data input unit 14 into, for example, binarized image data. In the embodiment shown in FIG. 1, the image data conversion unit 30 of the server 12 performs the conversion from color image data to binarized image data, however, in the third embodiment, this conversion is performed on the side of the mobile telephone 10. The server 12 as the second apparatus comprises an image data receiving unit 26, an image holding unit 28, an image data conversion unit 30, and a result data sending unit 32 and is basically the same as that in the first embodiment. However, since the image data conversion unit 30 includes the pre-processing unit 54 provided on the side of the mobile telephone 10, the data conversion unit 30 executes image data processing, except, for example, conversion processing from color image to binarized image, that is to be performed by the pre-processing unit 54, thus the processing load of the unit is reduced by the load assigned to the pre-processing unit.

Figure 8:
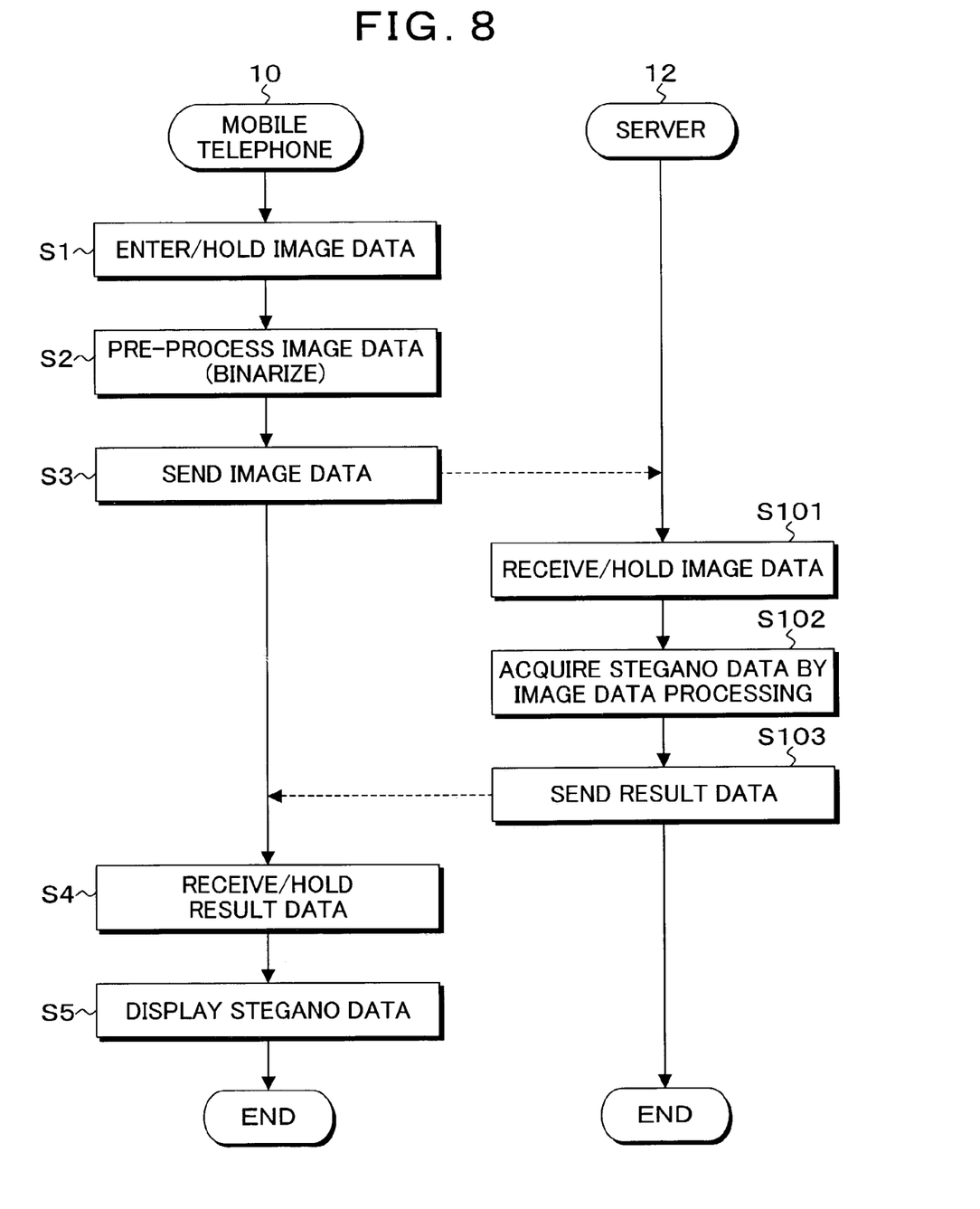
FIG. 8 is a time chart of processing procedures of a first apparatus and a second apparatus shown in FIG. 7.

FIG. 8 is a time chart of processing procedure including communications exchanged between the mobile telephone 10 and server 12 shown in FIG. 7, and referring to this time chart, operations of the third embodiment shown in FIG. 7 are described as follows. At step S1, the mobile telephone 10 enters the image data on the image taken from printed matters including stegano data by an image input unit 14 comprising a CMOS sensor or CCD sensor, and holds the entered image data in an image data holding unit 16. Then at step S2, pre-processing is executed for converting the color image data entered by the pre-processing unit 54 as the image data into binarized image data. Next at step S3, the pre-processed binarized image data is sent from an image data sending unit 18 to the server 12 through a communication path 42-1. At this time, destination information is also sent at the same time, wherein the destination information indicates the destination to which the result data is to be sent. At step S101, the server 12 receives the binarized image data from the mobile telephone 10 with an image data receiving unit 26, and holds the received image data in an image data holding unit 28. Next at step S102, an image data conversion unit 30 reads out the binarized image data that is being held, and executes a stegano data acquisition processing as disclosed in Specification and Drawings of U.S. Pat. No. 5,636,292. In this case, since the conversion from color image data to binarized image data has been finished in pre-processing of the mobile telephone 10, processing following this conversion is executed. The stegano data acquired by the image data conversion unit 30 is sent from a result data sending unit 32 to the mobile telephone 10 through a communication path 42-2. At step S4, the mobile telephone 10 receives the stegano data from the server 12 with a result data receiving unit 20, as a result data, and holds the received result data in a result data holding unit 22. Eventually at step S5, the received stegano data is displayed on the screen of a display unit 24. If the number of servers 12 is not enough for accommodating the presence of a large number of mobile telephones, this pre-processing on the side of the mobile telephone 10 in the third embodiment shown in FIG. 7 can reduce the load of image data processing for acquiring stegano data on the side of the server 12, and enables quick image processing to be made so that the result of stegano data is returned in response to the processing demand from the mobile telephone 10.

Figure 9:
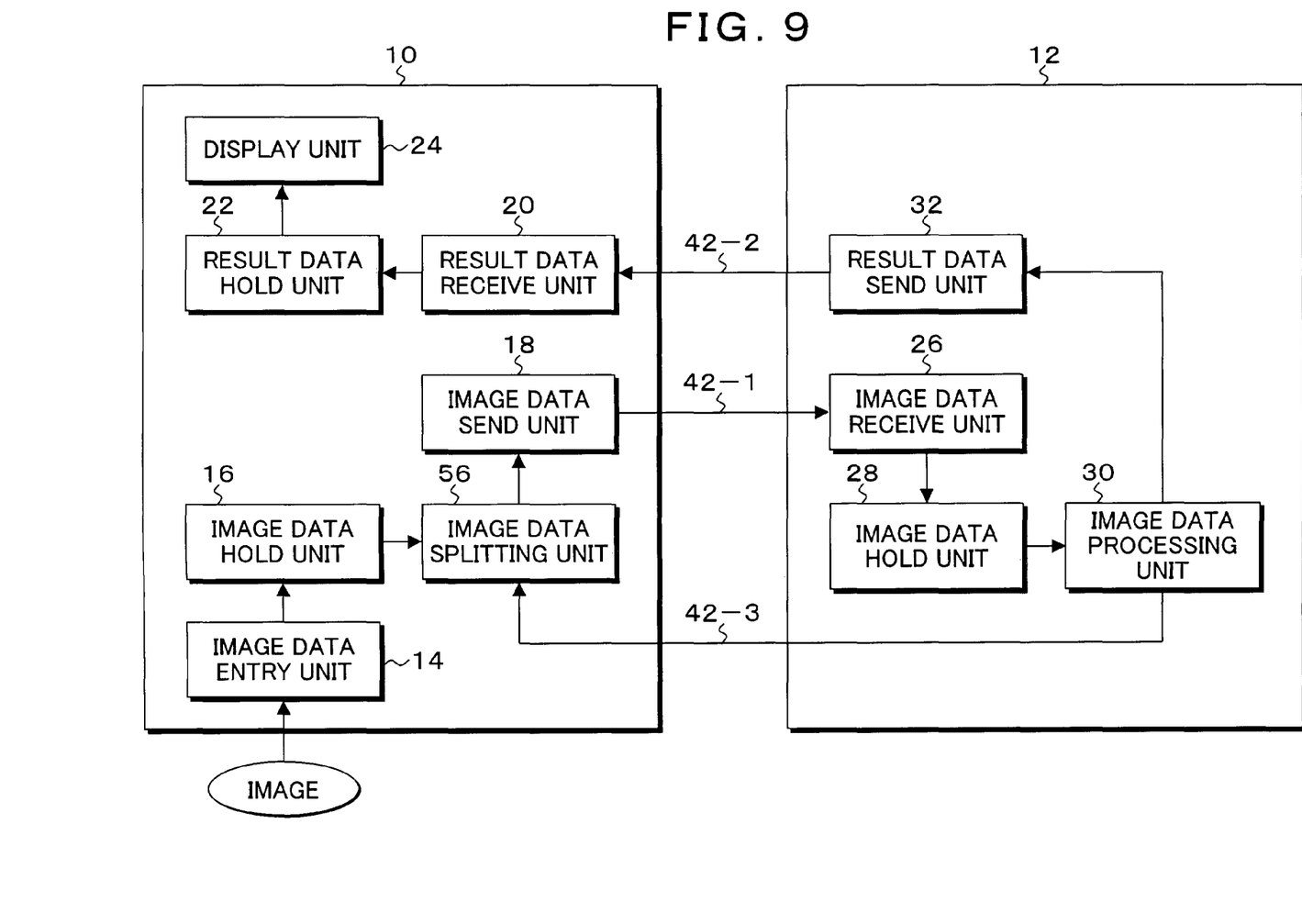
FIG. 9 is a block diagram of a fourth embodiment according to the present invention.

FIG. 9 is a block diagram of a fourth embodiment according to the present invention. This fourth embodiment is characterized in that portion of image data including stegano data is sent from the mobile telephone 10 for acquiring the result of processing. On the mobile telephone 10 as a first apparatus, an image data input unit 14, an image data holding unit 16, an image data sending unit 18, a result data receiving unit 20, a result data holding unit 22, and a display unit 24 are provided, and further an image data splitting unit 56 is additionally provided. The image data-splitting unit 56 splits the image data including the stegano data entered by the image data input unit 14 into a plurality of areas, and sends a portion of the split image data. If the stegano data cannot be acquired by sending of a portion of the image data, the image data-splitting unit repeatedly sends the remaining areas of the image data sequentially in response to a re-send request from the server 12, until stegano data is acquired. On the server 12 as a second apparatus, an image data receiving unit 26, an image data holding unit 28, an image data conversion unit 30, and a result data sending unit 32 are provided. Here, from the received image data, the image data conversion unit. 30 executes a stegano data acquisition processing, for example, as disclosed in Specification and Drawings of U.S. Pat. No. 5,636,292. At this time, if stegano data cannot be acquired, a re-send request is made to the image data splitting unit 56 of the mobile telephone 10 through a communication path 42-3 for sending the remaining portions of the image data from the image data sending unit 18. This re-send request from the image data conversion unit 30 to the mobile telephone 10 is repeatedly made until stegano data is acquired on the side of the server 12.

Figure 10:
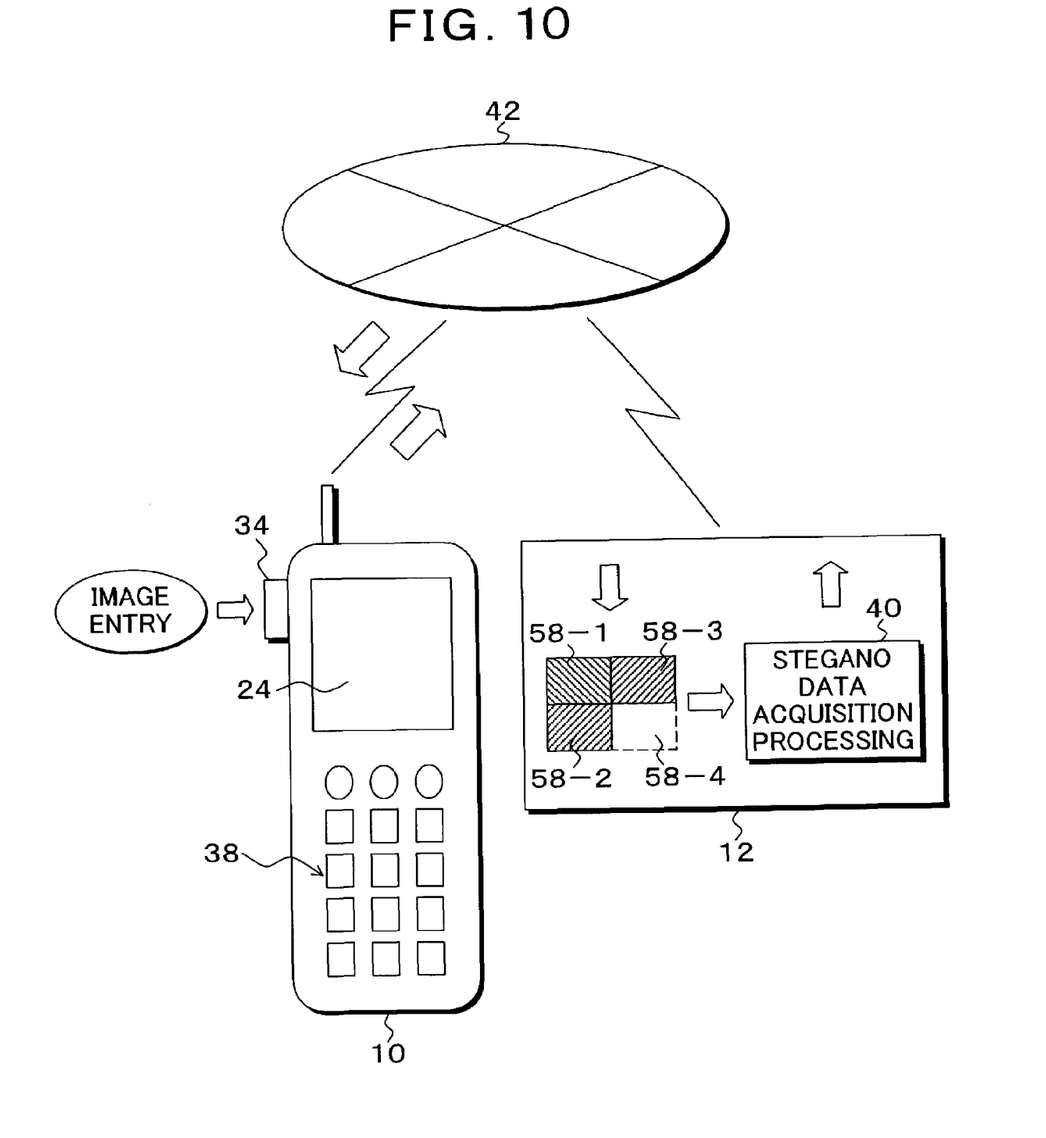
FIG. 10 is a diagram for describing image data processing operations according to FIG. 9.

FIG. 10 is a diagram for briefly describing image data processing operations in the fourth embodiment shown in FIG. 9. When printed matters or other images with stegano data embedded are entered by a camera 34 provided on the mobile telephone 10, after splitting the entered image data into a plurality of areas, the mobile telephone 10 sends the first split image data to the server 12 through a communication line 42, according to a specified sequence. If, for example, the image data is split into four areas, and a portion of the split image data is sent sequentially, the server 12 executes a stegano data acquisition processing 40 on the first received split data 58-1. If stegano data cannot be acquired by processing of this split image data 58-1, the server makes a re-send request to the mobile telephone 10, and receives the next split image data 58-2. When the split image data 58-2 is received in response to the re-send request, the server executes the stegano data acquisition processing 40 on the image data including the split image data 58-1 which has been previously received and held. Even though stegano data still cannot be acquired, the server has to make a re-send request to the mobile telephone 10 for acquiring a next split image data 58-3, and has to execute the stegano data acquisition processing 40. Usually, stegano data is embedded in printed matters, such that the same embedded information is scattered over the entire image. Therefore, by sending of the image data split into a plurality of areas sequentially by the mobile telephone 10, not using of the total image, in a certain circumstances, stegano data can be acquired only by sending of the first split image data 58-1. Even though stegano data cannot be acquired, stegano data will be acquired by sending of the remaining areas of the split image data following the first split area, thus as a result, the server 12 can acquire stegano data, without the need of sending all image data.

Figure 11A:
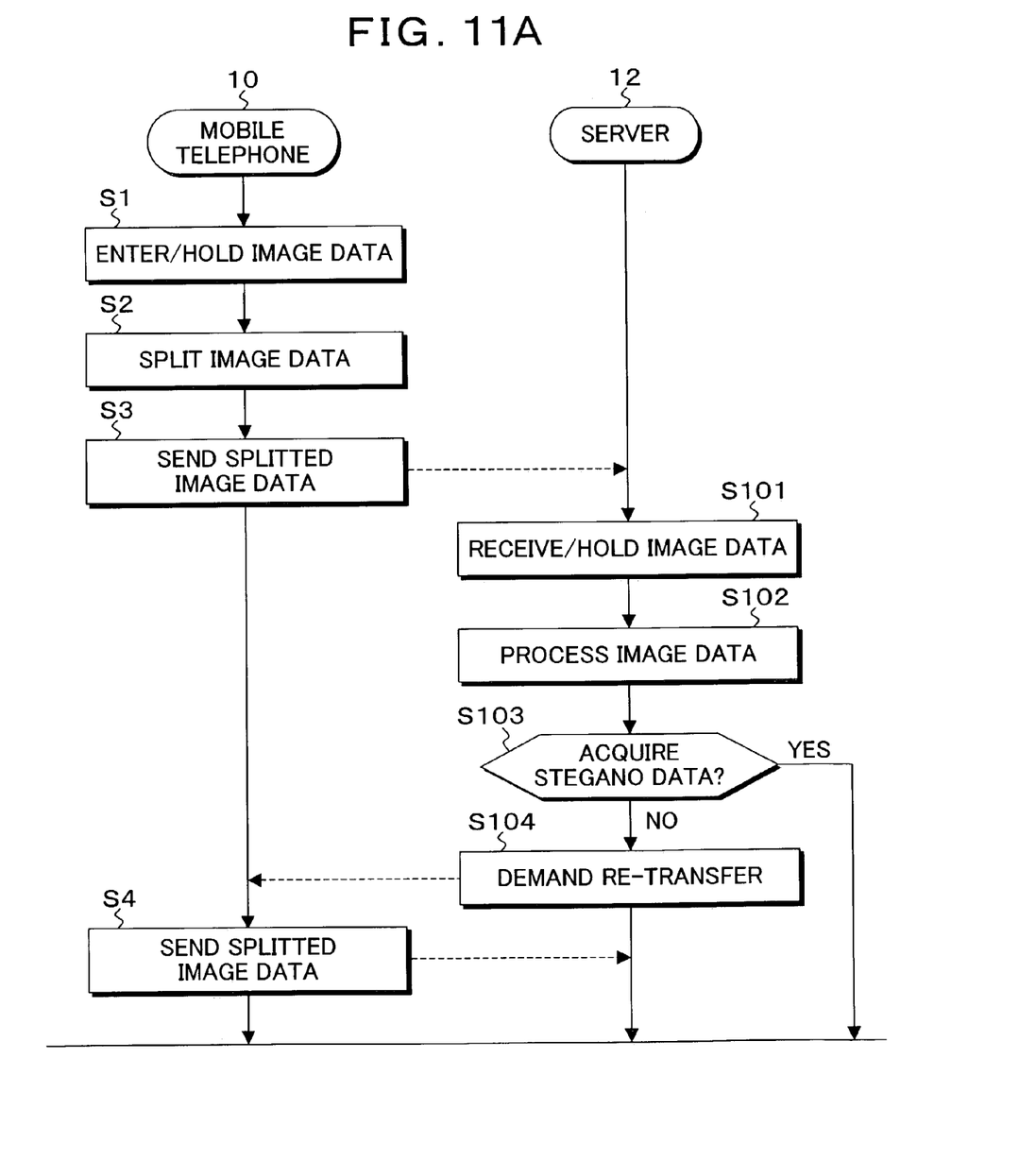
FIGS. 11A and 11B are time charts of processing procedures of a first apparatus and a second apparatus shown in FIG. 9.
Figure 11B:
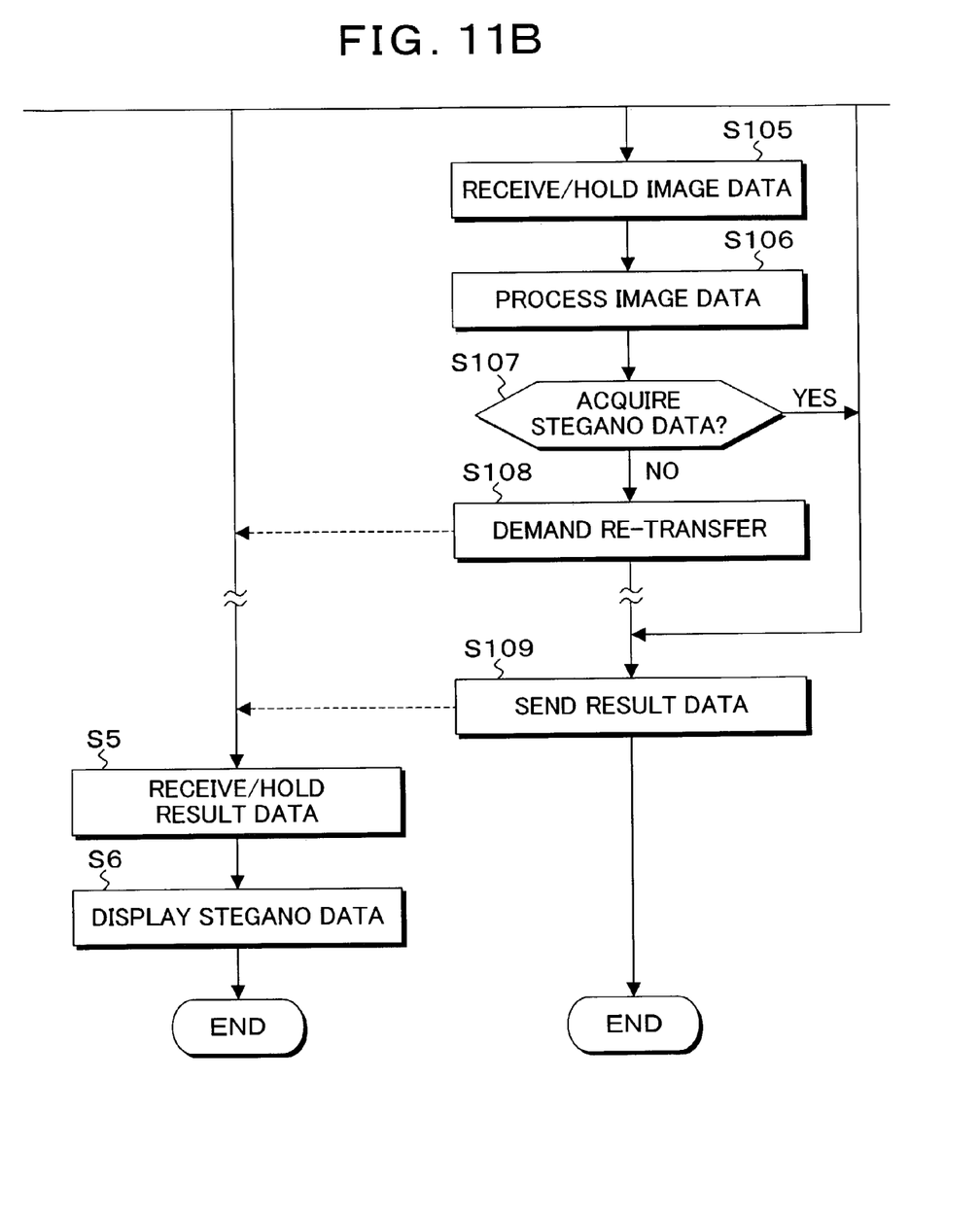

FIGS. 11A and 11B are time charts of processing procedure including communications exchanged between the mobile telephone 10 and server 12 in the fourth embodiment shown in FIG. 9, and based on this time chart, operations in the fourth embodiment shown in FIG. 9 are described as follows. Pictures of printed matters with stegano data embedded are taken by an image data input unit 14 realized by a CMOS sensor or CCD sensor provided on the mobile telephone 10 as a camera 34, and the image data is entered at step S1, and held in an image data holding unit 16. Then at step S2 the image data being held is split into a plurality of areas by an image data splitting unit 56, and part is taken out of the split image data, then at step S3, the split image data is sent to the server 12 through a communication path 42-1. At this time, destination information is simultaneously sent, wherein the destination information indicates the destination, to which the result of processing is to be sent. As to the split image data that should be sent first by the image splitting unit 56, for example, an area having a high possibility of stegano data being embedded may be preferentially selected from the total image data, and sent first. The server 12 allows an image data receiving unit 26 to receive part of the image data from the mobile telephone 10 at step S101, and holds the received image data in an image data holding unit 28, and at step S102, allows an image data conversion unit 30 to execute image processing of part of the image data for acquiring stegano data. If stegano data cannot be acquired at step S103, by this image data processing, the server makes a re-transfer request to the mobile telephone 10 at step S104. Having received the re-transfer request from the server 12, the mobile telephone 10 takes part out of the remaining split image data at step S4, and allows an image data sending unit 18 to send the taken out image data to the server 12. After receiving and holding this second split image data at step S105, the server 12 executes image data processing for extracting stegano data at step S106. In this case, too, if stegano data cannot be acquired at step S107, the server makes a re-transfer request to the mobile telephone 10 at step S108, and repeatedly executes the same processing until stegano data is acquired. If stegano data is acquired at step S103 or S107, the server goes to step S109, and sends the acquired stegano data as a result data from a result data sending unit 32 to the mobile telephone 10 through a communication path 42-2. The mobile telephone 10 allows a result data receiving unit 20 to receive the stegano data as a result data at step S5, and holds the received data in a result data holding unit 22. Then at step S6, the received stegano data is displayed on the screen of a display unit 24. Here, preferably the image data-splitting unit 56 splits image data into the size, which is less than or approximately equal to the accounting units of the mobile telephone 10. As described above, if the split size of image data is less than or approximately equal to the accounting units of the mobile telephone 10, in transferring the split image data from the mobile telephone 10 to the server 12, the communication route 42-1 is preferably intermittently connected only when the split image data is to be sent, but not normally connected. This method of intermittent connection can minimize cost required for the mobile telephone 10 transferring image data to the server for acquiring stegano data.

Figure 12:
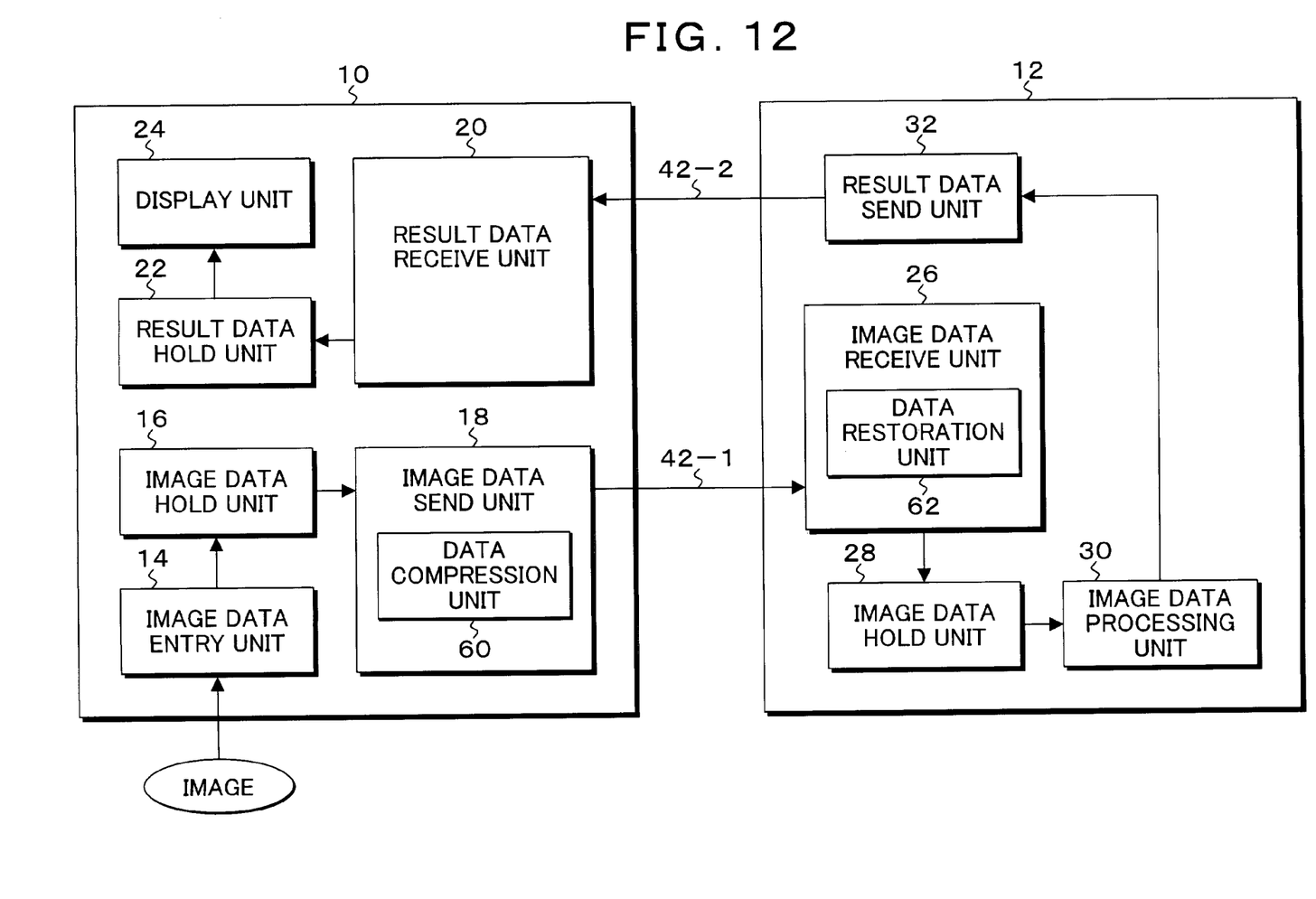
FIG. 12 is a block diagram of a fifth embodiment according to the present invention.

FIG. 12 is a block diagram of a fifth embodiment according to the present invention. This fifth embodiment is characterized in that the mobile telephone 10 compresses image data and sends to the server 12, and the server side restores the compressed image data and processes. To the mobile telephone 10, an image input unit 14, an image data holding unit 16, an image data sending unit 18, a result data receiving unit 20, a result data holding unit 22, and a display unit 24 are provided. In addition, a data compression unit 60 is provided on the image data sending unit 18. As a data compression method by the data compression unit 60, such a compression method must be taken that there is no possibility of stegano data being broken by compression. For example, if the stegano data disclosed in Specification and Drawings of U.S. Pat. No. 5,636,292 is used, a loss-less compression is employed. While on the side of the server 12, an image data receiving unit 26, an image data holding unit 28, an image data processing unit 30, and a result data sending unit 32 are provided. Furthermore, a data restoration unit 62 is provided on the image data receiving unit 26. The data restoration unit 62 implements a restoration method corresponding to the compression method of the data compression unit 60 on the mobile telephone side 10, and in this case, a restoration method is taken corresponding to the loss-less compression, a compression method that will not break stegano data. As described above, compressing and transferring image data in response to the request from the mobile telephone 10 to the server 12 for extracting stegano data can reduce the amount of image data to be sent, and furthermore, can reduce communication costs. Here, details of processing operations of the fifth embodiment shown in FIG. 12 are the same as those of the first embodiment shown in FIG. 1, except that the data compression unit 60 compresses the data, and the data restoration unit 62 restores the compressed data.

As described above, according to the present invention, even if a first apparatus is a mobile telephone with a camera having a limited processing performance, the first apparatus can execute processing at high speed and acquire the result, even if the executing processing is an analysis processing of information embedded in image data, that takes a lot of processing time, if, in order to acquire the result of processing, the first apparatus sends image data including stegano data to a second apparatus, in other words, a server which has a high processing capability and is connected to the first apparatus through a communication path. Also, the conversion of the acquired stegano data that is sent by the server as the second apparatus to the address, or the URL of another third apparatus further enables abundant information on stegano data to be acquired through access to the third apparatus, thus the amount of information on stegano data to be embedded in image data can be reduced. Also, in sending image data from the first apparatus to the second apparatus, part of image data is sent and a stegano data acquiring processing is performed. If stegano data cannot be acquired, a re-send request of the remaining image data is sequentially made and processed, such that the load of image processing on the second apparatus side can be reduced, and the speed of communication can be faster. Furthermore, when the first apparatus side performs part of image processing as pre-processing, wherein the image processing is required for stegano data acquiring processing in the second apparatus, the processing load of the second apparatus can be reduced. Furthermore, compressing and sending of image data from the first apparatus, and restoring of the compressed data on the side of the second apparatus can reduce the amount of data to be sent, and communication time, as well.

As to pre-processing on the side of the mobile telephone 10 in the third embodiment shown in FIG. 7, splitting and transfer of image data in the fourth embodiment shown in FIG. 9, and furthermore, compression and restoration of data in the fifth embodiment shown in FIG. 12, the first embodiment shown in FIG. 1 is cited as the object, however, in an embodiment where stegano data is converted to the address or URL of a third apparatus as shown in FIG. 4, the above-described embodiments can be similarly combined.

The above-described embodiments cite the case where a camera is employed for entering image, however, other than this, any appropriate image input processing including a scanner may be employed.

The above-described embodiments cite an example of a mobile telephone as a first apparatus, however, the present invention is not limited to mobile telephones, but covers any appropriate apparatus, if the apparatus has a relatively low image processing performance.

Although as stegano data, the above-described embodiments use by way of example the data as disclosed in Specification and Drawings of U.S. Pat. No. 5,636,292, the present invention is not limited thereto, but is applicable intactly to any stegano data based on other embedding methods.

In addition, the above-described embodiments use by way of example the data conversion from stegano data acquired by the server to the address or URL of the third apparatus; however, the data conversion of present invention includes not only the address, but also any other appropriate conversion objects.

The present invention covers any appropriate modifications without impairing the object and advantages thereof, and is not subject to any restriction by numerical values given in the above embodiments.

What is claimed is:

1. An image data processing apparatus comprising:
a first apparatus which takes an image data of an image on a medium and sends the image data to a second apparatus with destination information of a destination apparatus that receives a result of data processing to the image data taken;
the second apparatus which receives said image data and sender information from said first apparatus, effects data processing on said image data received to acquire an embedded stegano data that cannot be recognized visually, the second apparatus sending the acquired stegano data as a result of processing to the first apparatus in accordance with said destination information, said second apparatus having a high processing capability for processing stegano data.

2. The image data processing apparatus according to claim 1, wherein
a first apparatus comprises:
an image data taking unit which takes image data from an image on a medium;
a data sending unit which sends the image data taken and destination information of the first apparatus as a destination of a result of data processing to the image data taken to the second apparatus to receive the result of a data processing to the image data;
a result receiving unit which receives the result of the data processing to the image data; and
a display unit which displays the received result data, and wherein the second apparatus comprises:
an data receiving unit which receives said image data and said destination information from the said first apparatus;
an image data processing unit which effects data processing on said image data received to acquire stegano data; and
a result data sending unit which sends the result of the data processing to the image data to the first apparatus as the destination using said received destination information.

3. The image data processing apparatus according to claim 1, wherein the second apparatus further converts the acquired stegano data into a URL, for sending as the result of the data processing and wherein the destination apparatus further sends data for accessing a web server using the URL received as the result.

4. The image data processing apparatus according to claim 1, wherein the first apparatus further executes pre-processing of converting the image data into binary image data, the pre-processing being part of image processing to be performed on the side of the second apparatus.

5. The image data processing apparatus according to claim 1, wherein
the first apparatus splits the image data taken into a plurality of areas, to send some of the split image data to the second apparatus, and wherein the second apparatus effects image processing on the some image data received from the first apparatus, the second apparatus, if stegano data cannot be acquired, sequentially requesting the first apparatus to make a re-transfer, for image processing, of image data of the remaining split areas until the second apparatus acquires stegano data.

6. The image data processing apparatus according to claim 1, wherein the first apparatus compresses image data entered and held, for sending to the second apparatus, and wherein the second apparatus restores the compressed image data received from the first apparatus, for effecting image processing.

7. An image data processing method comprising:
   entering an image on a medium, by a first apparatus;
   sending the entered image data to a second apparatus with a destination information of a destination apparatus that receives a result of processing to the image data by the first apparatus;
   effecting data processing on the image data received from the first apparatus to acquire an embedded stegano data that cannot be recognized visually by the second apparatus;
   sending the result of the data processing to the image data to the destination using said destination information by the second apparatus; and
   receiving by the first apparatus, and displaying the received result data by the destination apparatus.

8. The image data processing method according to claim 7, wherein the second apparatus further the acquired stegano data into a URL and the sending sends the URL as a result to the destination apparatus, and wherein the destination apparatus sends by the destination apparatus.

9. The image data processing method according to claim 7, further comprising executing pre-processing of converting the image data into binary image data, the pre-processing being part of image processing to be performed on the side of the second apparatus by the first apparatus.

10. The image data processing method according to claim 7, wherein the first apparatus splits the entered image data into a plurality of areas and sends some of the split image data to the second apparatus, and wherein
   the second apparatus effects image processing on the some image data received from the first apparatus, the second apparatus, if stegano data cannot be acquired, sequentially requesting the first apparatus to make a re-transfer, for image processing, of the remaining split areas of the image data until the second apparatus acquires stegano data.

11. The image data processing method according to claim 7, wherein the first apparatus compresses the image data entered and held, for sending to the second apparatus, and wherein the second apparatus restores the compressed image data received from the first apparatus, for effecting image processing.

12. An apparatus which has a low processing capability for processing stegano data, comprising:
   a camera unit which takes a picture and enters image data, of an image on a medium;
   a data sending unit which sends the entered image data to a second apparatus with sender information;
   a data sending unit which sends the image data entered to the second apparatus with destination information of the first apparatus as a destination of a result of data processing to the image data taken to acquire an embedded stegano data that cannot be recognized visually;
   a result receiving unit which receives the result of the data processing to the image data taken from the second apparatus; and
   a display unit which displays said received result.

* * * * *